May 26, 1953

K. VERSEN 2,639,881

ELECTRICAL FIXTURE

Filed Aug. 25, 1950

INVENTOR.
KURT VERSEN

BY
ATTORNEY

Patented May 26, 1953

2,639,881

UNITED STATES PATENT OFFICE 2,639,881

ELECTRICAL FIXTURE

Kurt Versen, Tenafly, N. J.

Application August 25, 1950, Serial No. 181,381

3 Claims. (Cl. 248—345)

The present invention deals with an electrical fixture and more particularly with an electrical fixture canopy and supporting means therefor.

Electrical fixtures mounted on ceilings or walls usually comprise canopies for concealing mounting elements and electrical connections, e. g. outlet boxes, wiring, etc., which would otherwise present an unsightly appearance. Such canopies are either detachable from an installed fixture or are at least separable from walls and ceilings for fixture maintenance purposes especially when repair or examination of electrical connections recessed in walls or ceilings becomes necessary.

Various means have been proposed for securing electrical fixture canopies to walls and ceilings. However, such means necessitate certain adaptions of the canopy which increase manufacturing costs and problems and which require close tolerances or additional manufacturing stages, e. g. adapting the canopy to cooperate with threaded members, providing specific perforations through the canopy to cooperate with mounting studs or otherwise providing the canopy with mounting means which detract from the neatness of the canopy.

Figure 1:
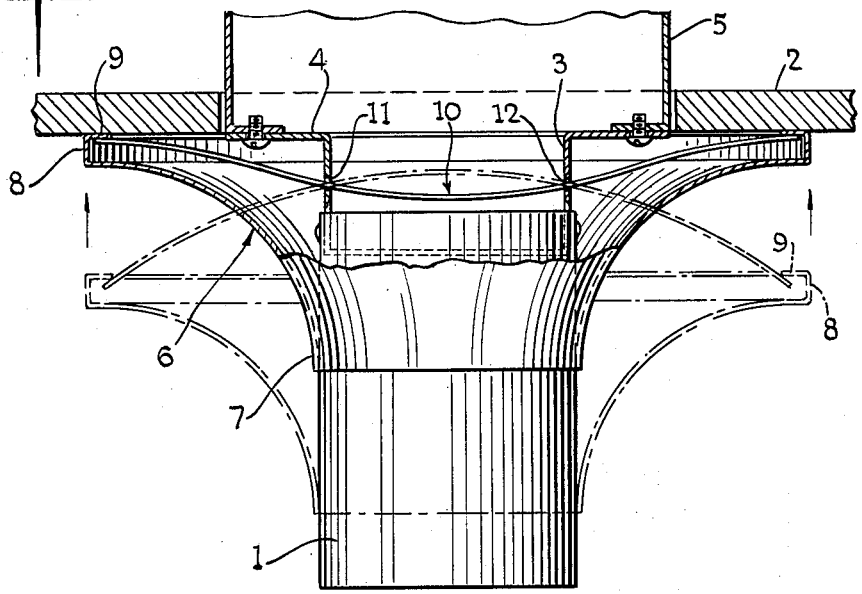
Figure 2:
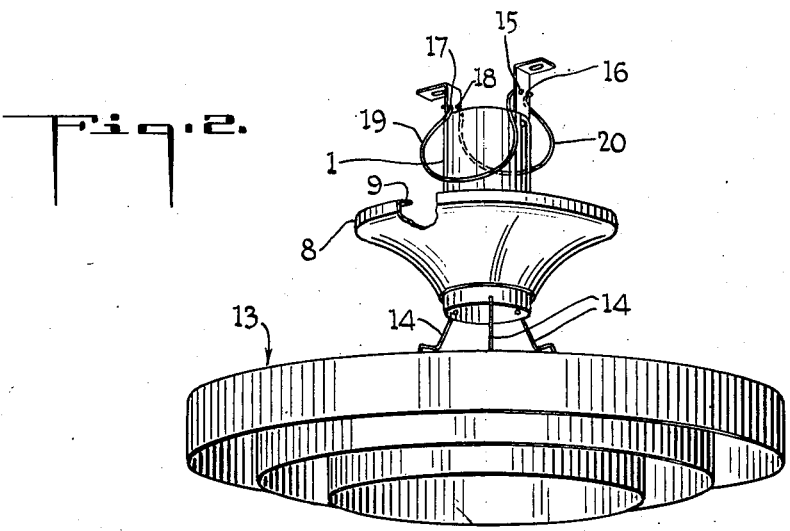

It is an object of the present invention to provide an electrical fixture canopy which is neat in appearance and which is free of visible supporting means. It is another object of the present invention to provide an electrical fixture canopy which is economical to manufacture and easy to install. It is a further object of the present invention to provide a canopy for electrical fixtures and a supporting means for maintaining the canopy in contact with walls and ceilings. Other objects of the present invention will become apparent from the description hereinafter following and the drawings forming part hereof, in which:

Fig. 1 illustrates the pertinent embodiments of the present invention shown partly in elevation and partly in section, and Fig. 2 illustrates a modification of certain embodiments shown in Fig. 1.

The present invention deals with an electrical fixture including a canopy and with such other embodiments of an electrical fixture which cooperate with a canopy supporting means in accordance with the invention to maintain the canopy in contact with ceilings or walls.

The illustrations show a structural arrangement of electrical fixture parts which are pertinent to the canopy. Electrical connections, wiring, etc., are omitted since they are superfluous in portraying the best mode of operation and advantages of the present invention.

Fig. 1 illustrates a ceiling mounted fixture comprising a lamp and socket supporting member or husk 1, e. g. a tubular member, mounted in fixed and spaced relation to the ceiling 2 by means of arms or brackets 3 and 4 extending upwardly of an end of said husk. The brackets are either individually connected to the husk diametrically of each other and parallel to the axis of the husk or they may be the extended arms of a single substantially U-shaped member which is either insertable into a tubular husk 1, or to which said tubular member is otherwise secured. The brackets 3 and 4 are preferably secured to an electrical outlet box 5 recessed into the ceiling and containing electrical wiring leading therefrom through the husk 1.

Since exposed electrical wiring and husk mounting means are undesirable, a canopy 6, e. g. a funnel-shaped, cylindrical or convex-shaped canopy, having axial openings, is provided for concealing such exposed wiring, etc., and comprises either a sleeve portion 7 axially slideable on the husk 1, or one of said axial openings is dimensioned so that the canopy is engageable with and slidably moveable over said husk, e. g. when a convex-shaped canopy is employed, and a portion 8 e. g. a rimmed portion, of a sufficiently large diameter to encompass the ceiling outlet 5 and contact the ceiling. The rimmed portion 8 is provided with an abutment 9 directed inwardly thereof, e. g. an abutment in the form of an inwardly directed flange as illustrated. The canopy 6 is supported and maintained in contact with the ceiling 2 by a resilient supporting means 10, e. g. of steel spring leaf, engageable with the abutment 9 and positioned internally of the canopy in such manner that its tendency to relieve itself of spring tension provides a thrust against the abutment and toward the ceiling and thereby supports the canopy against the ceiling. In order to provide the spring action in accordance with the present invention, the spring tension means is pivoted on both legs of the brackets 3 and 4 at a location spaced from the ceiling and is automatically adjustable for maintaining engagement with the abutment and, consequently, maintaining a spring tension sufficient to support the canopy. For example, an elongated spring leaf 10 is rendered automatically adjustable by the fact that it is normally substantially longer than the maximum diameter of the canopy, or extends laterally beyond the abutment means in horizontal position, or is longer than the diameter of the rimmed portion 8, and passes diametrically of the canopy, through slots 11 and 12 which not only act as pivots for the spring leaf but permit a bending of the leaf spring therebetween to provide said spring tension. The ends of the leaf spring engage the abutment and, due to the tendency of the spring leaf to relieve spring tension and assume its unbent state, force the canopy against the ceiling. Upon separation of the canopy from the ceiling, as shown by the broken lines of Fig. 1, the spring leaf pivots at both slots 11 and 12 and reverses its bent position between the brackets in a snap-back manner to provide a spring tension in reverse of the canopy supporting tension. It is apparent from the illustration that the spring leaf 10 as above described, in cooperation with said bracket slots provides a reversible tension means whereby the canopy is easily separated from the wall or ceiling and remains in separated position until again forced against the ceiling whereby it is maintained against the ceiling as described.

Fig. 2 illustrates a substantially complete fixture including a modification of the present invention. In order to portray a substantially complete fixture, the husk 1 is shown with fixture member 13 suspended therefrom by suspension hooks 14. In place of the spring leaf 10, a pair of spring loops, e. g. steel wire loops, may be utilized. The slots 11 and 12 of Fig. 1 are each substituted by a pair of laterally spaced holes 15, 16, 17 and 18 which engage the ends of the two spring wire loops 19 and 20, said wire ends being in pivotal engagement with said holes. The spring loops are positioned oppositely of each other on the said brackets 3 and 4 in wing-like manner and each loop engages the abutments 9 similarly to the ends of the leaf spring 10, i. e. the loops in normal horizontal position extend laterally beyond the rimmed portion 8 and due to the resiliency of the spring loops they are adapted to engage the abutments with a consequent deformation of the normal loop to provide a spring tension against the abutments. Since the ends of the loops 19 and 20 are pivoted in the above mentioned holes which are located on the brackets 3 and 4 at a location spaced from the ceiling, the tendency of the wire loops to assume normal form and to relieve their tension provides a thrust against the abutments and toward the ceiling and thereby support the canopy against the ceiling.

Although the description and illustrations deal primarily with ceiling mounted fixtures, it is within the scope of the invention to apply the said invention to wall-mounted fixtures as well as to pendant mounted ceiling fixtures of the plumb suspension type.

What I claim is:

1. An electrical fixture comprising in combination a tubular ceiling supported member, a canopy having an opening therethrough and through which the canopy is slidably mounted on said tubular member to upper and lower positions, a deformable spring means engaging said canopy at diametrically opposed points, means detachably securing said spring means to said canopy at said points, pivot means for the spring means carried by the tubular member between said points and positioned below said points when the canopy is at said upper position, said spring means having a total length greater than the distance between said points and being deformed when in engagement with said points and when at an intermediate position of the canopy biasing the canopy to either upper or lower positions, said upper position releasably holding the canopy against the said ceiling.

2. An electrical fixture according to claim 1, wherein said spring means is a spring leaf.

3. An electrical fixture according to claim 1, wherein said spring means constitutes a pair of spring loops pivoted laterally oppositely of each other on said pivot means.

KURT VERSEN

References Cited in the file of this patent

UNITED STATES PATENTS

| Number | Name | Date |
|---|---|---|
| 407,593 | Hollings | July 23, 1889 |
| 977,297 | Goodridge | Nov. 29, 1910 |
| 1,197,480 | Feldman et al. | Sept. 5, 1916 |
| 1,255,910 | Morey | Feb. 12, 1918 |
| 2,194,373 | Wright | Mar. 19, 1940 |
| 2,493,684 | Minton | Jan. 3, 1950 |

FOREIGN PATENTS

| Number | Country | Date |
|---|---|---|
| 122,262 | Austria | Apr. 10, 1931 |